(12) United States Patent
Shusteff et al.

(10) Patent No.: US 11,639,031 B2
(45) Date of Patent: May 2, 2023

(54) PHOTOCURABLE RESINS FOR VOLUMETRIC ADDITIVE MANUFACTURING

(71) Applicants: Lawrence Livermore National Security, LLC, Livermore, CA (US); The Regents of the University of California, Oakland, CA (US)

(72) Inventors: Maxim Shusteff, Piedmont, CA (US); James Oakdale, Castro Valley, CA (US); Robert Matthew Panas, Dublin, CA (US); Christopher M. Spadaccini, Oakland, CA (US); Hayden K. Taylor, Berkeley, CA (US); Brett Kelly, Berkeley, CA (US); Indrasen Bhattacharya, Berkeley, CA (US); Hossein Heidari, Berkeley, CA (US)

(73) Assignees: LAWRENCE LIVERMORE NATIONAL SECURITY, LLC, Livermore, CA (US); THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 234 days.

(21) Appl. No.: 15/930,822

(22) Filed: May 13, 2020

(65) Prior Publication Data
US 2020/0361152 A1 Nov. 19, 2020

Related U.S. Application Data

(60) Provisional application No. 62/847,199, filed on May 13, 2019.

(51) Int. Cl.
*B29C 64/393* (2017.01)
*C08F 2/50* (2006.01)
(Continued)

(52) U.S. Cl.
CPC .......... *B29C 64/393* (2017.08); *B29C 64/153* (2017.08); *B29C 64/232* (2017.08);
(Continued)

(58) Field of Classification Search
CPC ........ B33Y 10/00; B33Y 30/00; B33Y 50/02; B29C 64/106; B29C 64/277;
(Continued)

(56) References Cited

U.S. PATENT DOCUMENTS

2020/0384682 A1* 12/2020 Loterie ................ B29C 64/124
2021/0087301 A1* 3/2021 Gallais-During ..... G03F 7/2053
2021/0379819 A1* 12/2021 Delrot .................. B29C 64/124

FOREIGN PATENT DOCUMENTS

CN 105943406 A 9/2016
CN 107641200 A 1/2018
(Continued)

OTHER PUBLICATIONS

International Search Report and Written Opinion for International Application No. PCT/US2020/032619, dated Aug. 28, 2020 (12 pages).

*Primary Examiner* — Joseph S Del Sole
*Assistant Examiner* — Lawrence D. Hohenbrink, Jr.
(74) *Attorney, Agent, or Firm* — Harness, Dickey & Pierce, P.L.C.

(57) ABSTRACT

Methods and materials for volumetric additive manufacturing, including computed axial lithography ("CAL"), using photosensitive resins comprising a photocurable resin prepolymer; a photoinitiator; and (optionally) a curing inhibitor. In various embodiments, such photosensitive polymers comprise (a) one or more monomer (or prepolymer) molecules, which form the backbone of the polymer network of the
(Continued)

polymeric material and define its architecture; and (b) a photoinitiator that captures illumination energy and initiates polymerization.

11 Claims, 3 Drawing Sheets

(51) Int. Cl.
| | |
|---|---|
| *B29C 64/153* | (2017.01) |
| *B29C 64/232* | (2017.01) |
| *B33Y 50/02* | (2015.01) |
| *B33Y 30/00* | (2015.01) |
| *C08F 20/18* | (2006.01) |
| *B33Y 10/00* | (2015.01) |
| *B29K 33/00* | (2006.01) |
| *B33Y 70/10* | (2020.01) |
| *B33Y 40/20* | (2020.01) |
| *B29C 64/268* | (2017.01) |
| *B29C 64/282* | (2017.01) |
| *B29C 64/264* | (2017.01) |
| *B29C 64/124* | (2017.01) |
| *B29C 64/277* | (2017.01) |
| *B29C 64/241* | (2017.01) |
| *B29C 64/386* | (2017.01) |
| *B29C 64/106* | (2017.01) |

(52) U.S. Cl.
CPC ............... *B33Y 10/00* (2014.12); *B33Y 30/00* (2014.12); *B33Y 50/02* (2014.12); *C08F 2/50* (2013.01); *C08F 20/18* (2013.01); *B29C 64/106* (2017.08); *B29C 64/124* (2017.08); *B29C 64/241* (2017.08); *B29C 64/264* (2017.08); *B29C 64/268* (2017.08); *B29C 64/277* (2017.08); *B29C 64/282* (2017.08); *B29C 64/386* (2017.08); *B29K 2033/08* (2013.01); *B33Y 40/20* (2020.01); *B33Y 70/10* (2020.01)

(58) Field of Classification Search
CPC ... B29C 64/393; B29C 64/232; B29C 64/241; B29C 64/386; B29C 64/124; B29C 64/268; B29C 64/282; B29C 64/264
USPC .......................................... 264/40.7; 425/375
See application file for complete search history.

(56) References Cited

FOREIGN PATENT DOCUMENTS

| | | |
|---|---|---|
| CN | 109535330 A | 3/2019 |
| WO | WO-201 7048710 A1 | 3/2017 |
| WO | WO-2019043529 A1 | 3/2019 |

\* cited by examiner

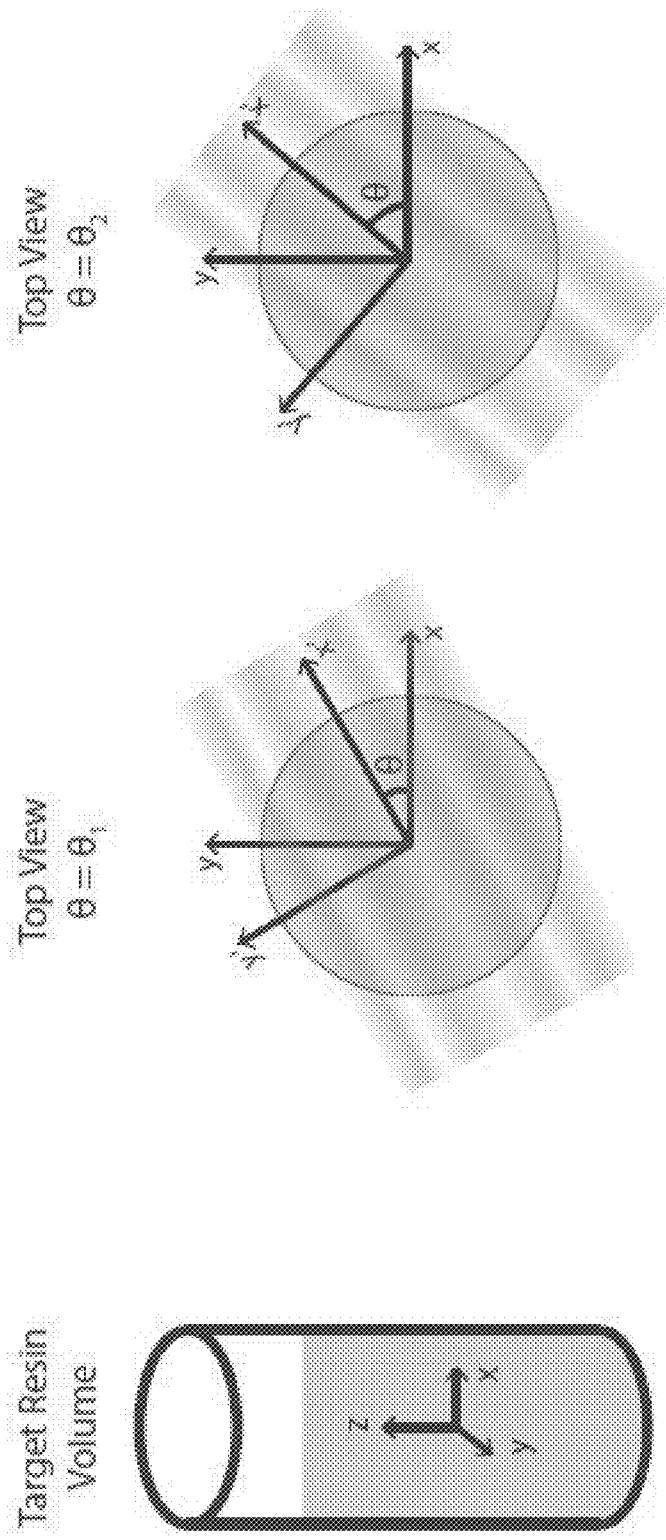

PHOTOCURABLE RESINS FOR VOLUMETRIC ADDITIVE MANUFACTURING

CROSS-REFERENCE TO RELATED APPLICATIONS

This application claims the benefit of U.S. Provisional Application No. 62/847,199, filed on May 13, 2019. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to materials and methods useful in additive manufacturing. For example, the technology described herein relates to resins useful in volumetric additive manufacturing.

BACKGROUND

The statements in this section merely provide background information related to the present disclosure and may not constitute prior art.

Additive manufacturing (AM) promises enormous geometrical freedom and the potential to combine materials for complex functions. AM technologies are increasingly used to produce end-use, multicomponent, and multi-material parts. For example, AM is used in producing patient-specific medical devices, optics, microfluidics, aerospace components, and in producing customized fixtures and tooling. Current AM processes create three-dimensional (3D) shapes through repeated one- or two-dimensional unit operations, wherein an object is produced by layer-by-layer formation (e.g., deposition) of material. However, in many applications, such layer-by-layer approaches may have limited throughput, and require significant post-processing. Such methods may not be suitable for producing certain shapes (geometries), such as in forming spanning, cantilevered, or overhanging elements or otherwise unsupported sections of structures. Further, in some cases, the resulting structure may have aesthetic or functional limitations, such as poor surface quality, and anisotropy of mechanical performance.

A manufacturing approach capable of simultaneously fabricating all points within an arbitrary three-dimensional volume provides a different strategy to address these issues and complement existing AM methods. This type of approach is known as volumetric AM ("VAM"), referring to producing an entire complex 3D structure in a single fabrication step. Building up a 3D illumination dose in space allows for volumetric creation of structures in a single step.

SUMMARY

This section provides a general summary of the present technology, and is not a comprehensive disclosure of its full scope or all of its features. Further areas of applicability will become apparent from the description provided herein.

The present technology provides method and materials for volumetric additive manufacturing, including computed axial lithography ("CAL"). Such methods generally utilize tomographic reconstruction techniques to create the 3D optical energy dose by projection of multiple images into a resin volume from many directions. In various embodiments, VAM methods comprise illuminating a photosensitive polymer resin that hardens upon curing. The properties of these resins in the present technology are tailored to the volumetric approach to successfully create high-fidelity 3D objects. These properties include a nonlinear polymerization response of the resin as a function of absorbed energy, significant light penetration, minimal and maximal loading of photoinitiator, and high viscosity.

In various embodiments, such photosensitive polymers comprise (a) one or more monomer (or prepolymer) molecules, which form the backbone of the polymer network of the polymeric material and define its architecture; and (b) a photoinitiator that captures illumination energy and initiates polymerization. Examples of such monomers include acrylates, methacrylates, olefins and epoxides, which may be cured by free-radicals, ring opening metathesis catalysts and Lewis acids, respectively.

In various aspects, such photopolymerizable polymers have one or more of the following characteristics: (a) non-linearity of response to illumination energy used in the CAL process; (b) transparency to the illumination energy; (c) viscosity suitable to control diffusive transport, settling of cured material, and spin-up time (for embodiments employing rotation); and (d) refractive index suitable to minimize distortions of images as they are projected into the volume of resin.

In various aspects, the present technology provides photocurable resins for use in a volumetric additive manufacturing process comprising: a photocurable resin prepolymer; a photoinitiator; and a curing inhibitor. In various aspects, the present technology provides resins for use in a volumetric additive manufacturing process wherein curing of the resin in a volume of the resin is initiated upon projection of illumination energy into the volume to form images of cured material, the resin comprising: a photocurable resin prepolymer; and a photoinitiator; wherein the resin has one or more of the following characteristics: (a) non-linearity of curing response to the illumination energy; (b) transparency to the illumination energy; (c) viscosity suitable to control diffusive transport and settling of cured material in the volume; and (d) a refractive index suitable to minimize distortions of the images as they are projected into the volume of the resin.

In some embodiments, the photocurable composition is a liquid at the conditions under which the CAL process is performed. In other embodiments, the composition is a solid or semi-solid (e.g., a gel).

Such methods may offer benefits relative to methods among those known in the art, such as allowing for different ways to integrate multiple components and may widen the material landscape to enhance the functionality of finished parts. CAL methods of the present technology may also allow use of a broader range of photopolymers compared to conventional AM, by allowing the use of higher-viscosity materials. Layer-based photopolymer printing technologies typically impose a maximum viscosity limit on the prepolymer mixture to allow the resin to reflow between the printing of subsequent layers. To meet this major design constraint, photopolymer formulations are often blended with reactive diluent monomers to reduce the resin viscosity. This process can adversely affect the properties of the resulting solid material. In the processes of the present technology, more viscous materials can be used because flow of the material is not required during printing CAL can thus enable printing of materials that are otherwise difficult or slow to 3D print because of their high viscosity in the precursor form.

BRIEF DESCRIPTION OF THE DRAWINGS

The drawings described herein are for illustrative purposes only of selected embodiments and not all possible implementations, and are not intended to limit the scope of the present disclosure.

FIGS. 1B-1D illustrate the coordinate system that is used in the present disclosure to help describe the various embodiments;

DETAILED DESCRIPTION

Figure 1A:
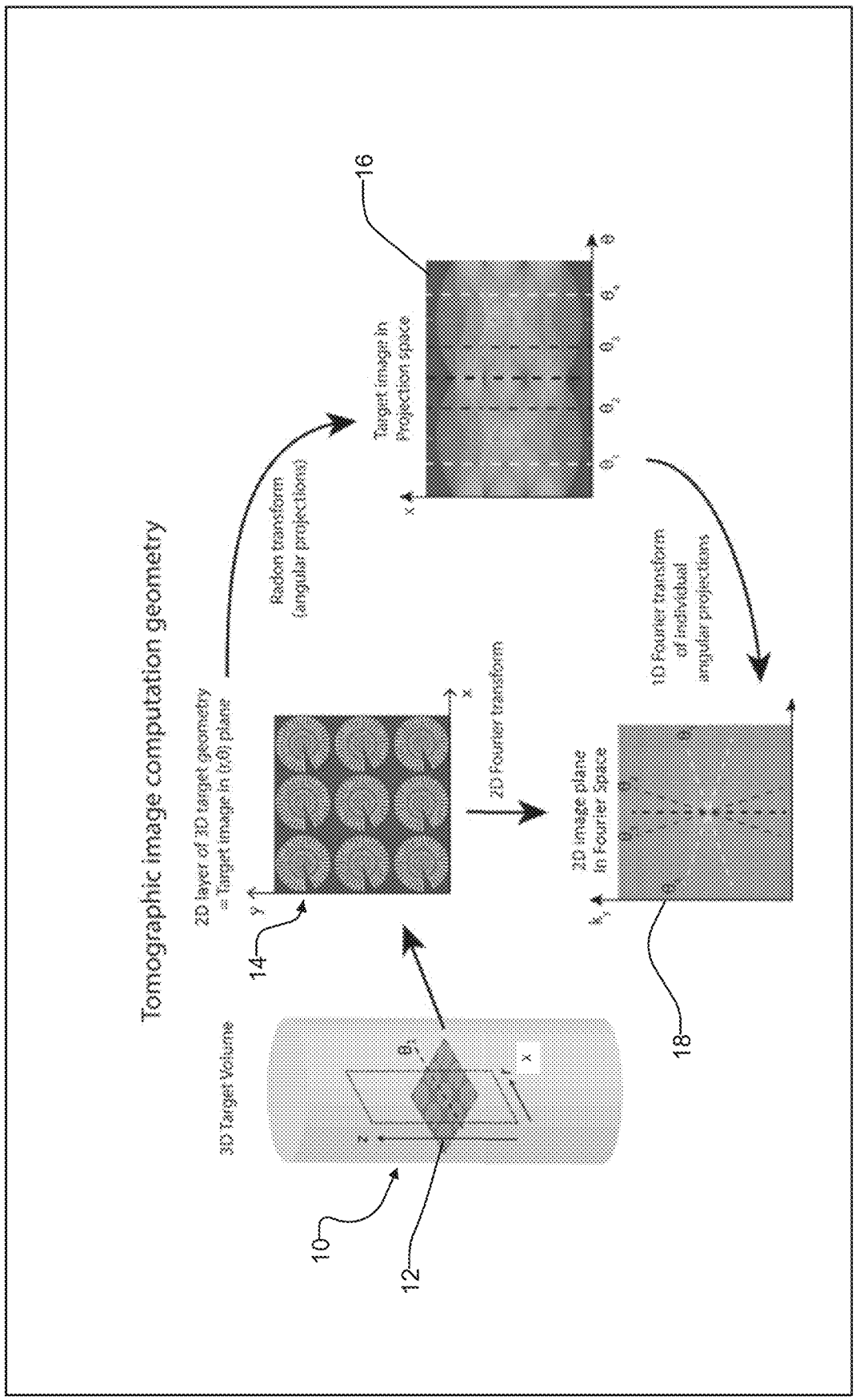
FIG. 1A shows a plurality of diagrams providing an overview of the underlying mathematical relationships used to computationally design optical projections. These optical projections can be generated physically by various embodiments of the present disclosure to create a target intensity distribution.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. It should be understood that the description and specific examples are intended for purposes of illustration only and are not intended to limit the scope of the present disclosure. A non-limiting discussion of terms and phrases intended to aid understanding of the present technology is provided at the end of this Detailed Description.

As further described below, the present technology provides VAM methods, particularly CAL methods. Such CAL methods generally comprise selectively solidifying regions of a volume of photosensitive resin of the present technology.

In various aspects, each image is propagated (e.g, is projected) through the material from a different angle. The superposition of exposures from multiple angles results in a three-dimensional energy dose sufficient to solidify the material in the desired geometry (i.e., three-dimensional shape of the product to be formed).

Photocurable Compositions

The present technology provides photocurable (photosensitive, photoresponsive) compositions (resins) useful in CAL and other VAM methods. As noted above and further described below, in various embodiments, such compositions are liquids at the conditions of printing and are cured by cross-linking to form a solid polymeric material in a light-induced curing process. In some embodiments, the compositions are solids or semi-solids at the conditions of printing.

As noted above, the photocurable compositions are cured upon exposure to curing radiation (light), delivered to a volume of the composition during methods of the present technology. The specific wavelength of light is selected according to the resin composition, in particular the photoinitiator in the composition (as further described below). In various embodiments, the light is visible light or ultraviolet light. For example, the light may have a wavelength from 350 to 800 nm. In some embodiments, the wavelength is from 400 to 410 nm. Curing radiation (light energy) is delivered to the volume in a set of two-dimensional images. In various embodiments, light energy has an intensity in the range of ~0.1 to 2.0 mW/cm$^2$.

Such compositions comprise (a) one or more monomer (or prepolymer) molecules, which form the backbone of the polymer network of the cured polymeric material and define its architecture; and (b) a photo-responsive species (a photoinitiator or "PI") that captures illumination energy and initiates polymerization. The compositions may contain optional materials, such as light absorbers, reactive or non-reactive diluents, inhibitors, and colorants.

In various embodiments, the resin composition comprises one or more monomers having latent functional groups that can be made to react with one another by an exogenous stimulus, e.g., reactive intermediates generated by the action of a curing radiation (light) on a photoinitiator species. Examples of such functional groups include acrylates, methacrylates, olefins and epoxides, which may be cured by free-radicals, ring opening metathesis catalysts and Lewis acids, respectively. Additionally, some functional groups require two components to cure. Examples include thiols+olefins, or silanes+olefins, which can be cured by free-radicals and hydrosilylation catalysts, respectively. Curing leads to the formation of a network consisting of cross-linked polymer chains. The extent of cross-linking and chemical composition of the polymer chain controls the mechanical and thermal properties of the cured part. As an example, a resin consisting of polydimethylsiloxanes with olefins and silane functional groups can be cured to form soft elastomeric materials. In another example, hard, glassy materials can be formed by curing methacrylate containing monomers. Additionally, dual-cure systems consisting of monomers with different functional groups may also be used in this process. In a dual-cure system, one component may react under independent control from another component. For instance, a dual cure system consisting of monomers containing acrylate, isocyanate and alcohol functional groups may be used such that the acrylate containing monomers are selectively cured during the printing process to form a primary network structure. The isocyanate and alcohol functional group containing monomers are then cured during a secondary thermal processing step to arrive at a material containing two polymer networks. Higher order tri-, tetra-, penta-cure, etc. systems may also be used.

In various aspects, the present technology provides CAL-polymerizable compositions having one or more of the following characteristics: (a) non-linearity of response to illumination energy used in the CAL process; (b) transparency to the illumination energy; (c) viscosity suitable to control diffusive transport, settling of cured material, and spin-up time (for embodiments employing rotation); and (d) refractive index suitable to minimize distortions of images as they are projected into the volume of resin. In various embodiments, the compositions have two or more, or three or more, or all of the characteristics.

Nonlinearity of Response to Illumination Energy

The transition of a polymerizable composition from liquid to solid preferably exhibits a threshold behavior, such that when it receives an energy dose below that threshold, the material remains liquid, and above the critical dose Dc, it solidifies.

In some embodiments, threshold behavior is enabled by incorporating an inhibitory chemical species (curing inhibitor) in the resin, which prevents polymerization. As the photo-induced polymerization reaction is driven forward by absorption of light energy, the inhibitor acts to prevent the reaction from proceeding. The inhibitor species is itself consumed or transformed during the process, such that when it becomes locally depleted at some location in space, the polymerization reaction can proceed unconstrained. This provides the required threshold.

One useful curing inhibitor for resins with acrylate functional groups is dissolved molecular oxygen ($O_2$), which is strongly inhibitory toward radical-induced chain polymerization of acrylated monomers. Dissolved oxygen is present at an equilibrium concentration in such resins anytime they are used in an oxygen-containing ambient (air). Other curing inhibitors useful in the present methods include hydroquinone and its derivatives, TEMPO (2,2,6,6-Tetramethyl-1-piperidinyloxy), phenothiazine (PZT), 4-methoxyphenol (MeHQ), N-Nitroso-N-phenylhydroxylamine aluminum salt (ANPHA), Tetraethylthiuram disulfide, and nitroxide spin trap agents such as Di-tert-butyl nitroxide, 2,2,5-Trimethyl-4-phenyl-3-azahexane-3-nitroxide, and combinations thereof.

While consuming the inhibitory species, photoinitiator molecules are also consumed in the inhibition process. Sufficient PI must be mixed into the resin to enable the desired degree of polymerization after exceeding the inhibitory threshold (at least two-fold and preferably five-fold greater concentration than the initial concentration of inhibitor).

In some embodiments, a resin using dissolved oxygen from the ambient environment as the inhibitor may be regenerated, enabling unpolymerized resin to be used for further formation of structures. Such regeneration may be accomplished by reintroducing dissolved oxygen into the resin composition at the equilibrium concentration. In various embodiments, the regeneration comprises heating and stirring. For example, one such process comprises:

(a) warming the volume of unpolymerized resin, such as in a water bath at 60° C. for 5 to 20 seconds, to reduce the viscosity of the resin;

(b) exposing the resin to oxygen, such as by transferring the resin to a vessel wherein the resin has a large surface area exposed to ambient air; and (c) transferring the resin to the container use for the CAL process.

Resin Transparency

In order to achieve the desired degree of cure throughout the full build volume, curing radiation must penetrate through the build volume. Sufficient energy for curing the material must build up at all points within the object to be fabricated. At the wavelength of interest, light propagation into the depth of a resin volume with modest absorbance is characterized by a penetration depth $D_p$, which is the distance at which the incident light intensity is reduced to 1/e of its initial value. The resin should be formulated such that the value of $D_p$ is between one and ten times the length of the container radius, and preferably between one and two times. Analysis of the optimal achievable curing speeds suggests that the fastest build times are achieved when the penetration depth equals the radius of the build container.

In some embodiments, the composition of the resin may be selected to be non-transmissive at any and all wavelengths other than the curing radiation wavelength.

In order to allow deep penetration into the resin, in some embodiments, the photoinitiator has low molar absorptivity, such that it takes a relatively large concentration of photoinitiator to achieve a given absorbance. The absorptivity values should be between 1 and 100 L/mol*cm, and preferably 5-10 L/mol*cm. Note that this is the opposite of the much higher absorbance typically desired for conventional stereolithography (SLA) processes. In some embodiments, use of a photoinitiator with low molar absorptivity may enable the desired degree of polymerization after exceeding the inhibitory threshold. Photoinitiators among those useful in the compositions and methods of the present technology are further described below as to exemplary resins.

In some embodiments, monitoring the transmitted light through the resin volume may be a convenient way to directly measure absorption during the build, being a means of providing feedback to the projection algorithm.

Viscosity

The viscosity of the liquid resin controls several important timescales during the CAL process, which include diffusive transport of species during the photochemical reaction, gravity-induced settling of the cured material. In addition, when CAL is configured with a rotating build container, the viscosity controls the timescale to "spin-up" of the rotating volume to steady-state (non-shearing) condition. In all cases, higher viscosities offer benefits for the resolution and feature fidelity of the CAL process. However, high viscosity materials present practical challenges for handling, rinsing and homogeneity of the build volume; these must be traded off against the benefits.

One such factor may be diffusive transport. Reaching the threshold nonlinearity of photochemical process relies on the competition between the inhibitory species and the photo-induced radicals that drive the reaction. As inhibitor molecules are depleted at a particular location as the reaction proceeds, if the build time is long enough, inhibitor molecules diffuse from adjacent un-depleted regions. Since the diffusion timescale within a fluid is directly proportional to its viscosity, higher viscosity will allow for longer build times without adversely affecting resolution.

Another factor may be gravity-driven settling of cured material: Typical resin chemistries undergo a modest (~5-10%) density increase upon full curing, which induces a downward drift of the cured structure. Because the terminal drift velocity is inversely proportional to viscosity (as is the time to reach that velocity) higher-viscosity resins are preferred.

In some embodiments, the absence of solid support structures in CAL may be possible because the uncured photosensitive material surrounding a printed structure exerts adequate forces to prevent it from sinking. To provide a framework for estimating the likely effects of gravity on partially printed geometries, the time-dependent vertical velocity V of a printed sphere of radius $R_p$ may be modeled in a photosensitive liquid of dynamic viscosity p. Letting g be the gravitational acceleration, $\rho_s$ the mass density of the cured material, and $\rho_f$ that of the uncured fluid. The sphere experiences a net gravitational force of $$F_g = 4/3(\rho_s - \rho_f) g \pi R_p^3$$

while the opposing Stokes drag on the sphere is $$F_s = 6\pi\mu R_p V.$$

The sphere's vertical velocity can therefore be expressed as:

$$\frac{dV}{dt} = \frac{\rho_s - \rho_f}{\rho_s} g - \frac{9\mu}{2R_p^2 \rho_s} V$$

which integrates to:

$$V = \frac{2gR_p^2(\rho_s - \rho_f)}{9\mu}\left(1 - e^{-\frac{9\mu t}{2R_p^2 \rho_s}}\right)$$

where solidification is assumed to occur instantaneously at time t=0. The above relationship shows that the time constant for reaching the terminal velocity is $2R_\rho^2\rho_s/9\mu$.

Assuming a volume shrinkage of 10% upon curing, which is at the upper end of the typical range for acrylate-based crosslinking in some embodiments, a mass density increase of 10% may result, meaning that $\rho_s=1.1\rho_f$. Assuming $\rho_f=1100$ kg/m³ and take $\mu=5000$ cP (centipoise) E 5 Pa s, as measured for the BPAGDA/PEGDA mixture. With these assumptions, the time constant for a printed component of radius $R_\rho=5$ mm to reach terminal velocity is ~1.3 ms, and the final velocity is 1.2 mm/s.

If such sinking velocities are realized during printing, mm-scale geometries may be significantly blurred during the print times of about 2 minutes. However, in fact, sub-mm features are sharply resolved in CAL. Moreover, successful volumetric printing of mm-scale structures may be performed in much lower viscosity (~12 cP) materials with ≤10 s print times.

In some embodiments, the resin may be formulated to have a finite yield stress (separate from viscosity considerations) to avoid parts sinking at any build rate. The force arising from the density change should not exceed the yield stress value.

Another factor is spin-up time to steady-state, in processes using a rotating build container: when the container is rotated relative to the projection source, the fluid within must be allowed to reach steady-state, to eliminate shearing within the fluid which would cause distortion of the part during printing. The timescale to reach steady-state is inversely proportional to the viscosity (or to its square root, depending on the Reynolds number that characterizes the rotational flow). In various embodiments, all points in the photosensitive material must have an equal angular velocity relative to the projection direction. In principle, either the projector can be rotated around a container of stationary material, or the material container can be rotated relative to a stationary projector. The latter approach is taken in the present work, and it may be considered to offer a simpler apparatus than one with a rotating projector. However, the time taken to 'spin-up' the photosensitive material from rest to a steady angular velocity for printing must be considered.

The spinning up of a body of fluid to a steady state of constant angular velocity—also referred to as the 'rigid body' condition—has been widely studied, and the required time depends on the relationship between the geometry of the container, its angular velocity, and the kinematic viscosity of the fluid. For higher velocities, lower viscosities and larger geometries, the spin-up time is governed by outward radial secondary flows which are caused by centrifugal forces, drive convective mixing, and are described by the Ekman time:

$$t_{Ekman} = H\nu^{-0.5}\Omega^{-0.5}$$

where H is the height of a cylindrical container measured along the rotation axis, ν is the kinematic viscosity, and Ω is the rotational velocity. For lower velocities, larger viscosities and smaller geometries, the spin-up time is governed by diffusion of momentum, and the radial diffusion time is given by:

$$t_{Diffusion} = R^2\nu^{-1}$$

For a given condition, the smaller of $t_{Ekman}$ and $t_{Diffusion}$ can be considered predictive of the spin-up time. These times are evaluated as: (A) the present technology, taking an angular velocity of 15°/s and the largest print volume (radius 15 mm) used; (B) a scaled-up print volume with R=0.25 m but with the same resin properties, angular velocity and projector frame rate as case A; (C) a scaled-up case with R=0.25 m, but considering the case where, rather than using a conventional video frame rate, $f_p$, of 25 Hz, a much higher refresh rate of 10 kHz is assumed. This refresh rate is consistent with the maximum available binary image refresh rate of a state-of-the-art micromirror display, and represents one possibility for increasing printing speed. The angular velocity is scaled up in proportion to $f_p$, to maintain comparable angular resolution with cases A and B. The times are evaluated assuming H=R√2, which is consistent with a cubic target print volume circumscribed by the container. Diffusion of momentum dominates the spin-up process, which is completed in less than 0.1 s. For a larger print volume of R=0.25 m at unchanged angular velocity, the spin-up time is expected to exceed 10 s, yet is still unlikely to dominate the total printing time of ~200 s. The spin-up delay could, however, become problematic at even larger values of R. Increasing rotational velocity would be expected to reduce the spin-up delay by lowering the Ekman time, and could be valuable for very large print volumes.

Accordingly, higher viscosities may be advantageous in some embodiments for more quickly attaining the steady-state. For example, at the high limit of viscosity, the resins may be are solidified or gelled materials. Printing into solids may be preferred in some embodiments. For example, in some embodiments, the resin formulation may be solid during the exposure and, after exposure, uncured material is liquefied or dissolved, and removed. Such processes may comprise use of heat, solvents, or both to liquefy or dissolve uncured materials. In some embodiments, uncured material is removed after exposure by solvent rinsing, which may be combined with moderate heating to liquefy or reduce the viscosity of the uncured material, so to liberate the printed structure. For example, for bisphenol A (BPA) resin systems, uncured resin may be heated to a temperature of from 60-80° C., reducing the viscosity from greater than 5000 cP to from 50 to 100 cP. Suitable solvents include water (for aqueous systems) or acetone or ethanol (for non-aqueous systems).

In various embodiments, the viscosity of the resin is 1000 cP or greater. For example, in some embodiments, methods employ highly viscous (up to 90,000 centipoises) or solid (thermally gelled) precursor materials. For example, in some embodiments, the resin is a gelatin methacrylate (GeIMA) hydrogel material. GeIMA is "thermally gelled" at room temperature, such that it does not flow and is a gel (even when not cross-linked). However, heating the gel to a temperature above 30° C. allows unpolymerized regions to flow, so that uncured areas of the resin will flow and are removed from the cured printed part.

Refractive Index

Similarly to the density change upon solidification, typical resins also experience an increase in their refractive index (RI). The increase in RI can distort the propagation of images as curing radiation is projected into the resin volume during the process, due to scattering and waveguiding effects from self-focusing in the resin. Resin components are preferably chosen to minimize the RI change upon curing. Alternatively, formulations can be designed such that the RI change is delayed until late in the chemical conversion process. In various embodiments, the RI change is 0.03 or less, 0.02 or less or (preferably) 0.01 or less, and occurs no earlier than at the time when 90% of the exposure energy has been delivered to the build volume.

Exemplary Resins

Resin systems among those useful herein include those formulated from commercially-available acrylate photopolymers and photoinitiators. Sufficiently low values of absorption coefficient may be enabled by selection of the photoinitiator molecule based on its molar absorptivity in the illuminating wavelength band and tuning of its concentration For example, a resin may comprise a mixture of two acrylate polymer components: bisphenol A glycerolate (1 glycerol/phenol) diacrylate (BPAGDA), mixed at 75:25 wt % with poly(ethylene glycol) diacrylate (PEGDA) (average Mn=250 g/mol). The viscosity of this polymer mixture may be determined via cone-and-plate rheometry (e.g., TA Instruments AR 2000) to have a value of approximately 5200 cP a steady strain rate of 1/s, falling to approximately 4700 cP in the shear strain rate range 10/s to 100/s. The resin further comprises a type 2 photoinitiating system comprising the photoinitiator camphorquinone (CQ) and coinitiator ethyl 4-dimethylaminobenzoate (EDAB), at 1:1 ratio by weight. The molar concentration of CQ in the resin formulation may be 5.2 mM, selected to achieve an appropriate absorptivity of the resin.

In another example, a 7:1 mixture of BPAGDA with 250 g/mol PEGDA may be used, with CQ and EDAB. Such a composition may have a higher viscosity, e.g., 93,000±5,000 cP.

Another resin is a hydrogel comprising gelatin methacrylate (GelMA) polymer, dissolved 10% w/v in phosphate buffered saline. The resin comprised a two-part visible light initiator consisting of tris(2,2-bipyridyl)dichlororuthenium (II) hexahydrate (Ru) and sodium persulfate (SPS) (32), mixed at concentrations of 2 mM and 20 mM respectively into the GelMA hydrogel. Hydrogel samples may be cooled in a refrigerator to 2-5° C. to induce reversible thermal gelation and render the samples solid before photocrosslinking with CAL.

Additional polymers include pentaerythritol tetraacrylate (PETA), and thiol-ene systems, comprising at least one component with thiol functional groups, and at least one component with vinyl or allyl groups. Thiol-ene systems include a 1:1 molar mixture of tris[2-(3-mercaptopropionyloxy)ethyl] isocyanurate (TMEI) and 1,3,5-triallyl-1,3,5-triazine-2,4,6(1H,3H,5H)-trione (TATATO), and a 0.15:0.85:1 (moles of functional groups) mixture of triethylene glycol diallyl ether (TGDE):TATATO:TMEI.

In various embodiments, the resin compositions of the present technology may comprise any Norrish Type I or Type II photoinitiator compounds, preferably being sufficiently soluble and meeting absorbance criteria as described above. Exemplary photoinitiators include phenylbis(2,4,6-trimethylbenzoyl)phosphine oxide, bis(η5-2,4-cylcopentadien-1-yl)-bis(2,6-difluoro-3-(1H-pyrrol-1-yl)-phenyl) titanium (Irgacure 784, BASF), and 2-Methyl-4'-(methylthio)-2-morpholinopropiophenone, known as Irgacure 907, BASF).

The concentration of the photoinitiator molecules in each polymer may be selected to give reasonable absorbance at the illuminating wavelength. To set the photoinitiator concentration, absorbance values for the 3:1 BPAGDA/PEGDA and GelMA photoinitiator-resin mixtures may be measured using UV-VIS spectrophotometry (Shimadzu UV-1280). Absorbance is defined as where $A(\lambda)$ is the absorbance at a particular wavelength of illumination, $T(\lambda)$ is the transmittance at that wavelength and $\phi(\lambda)$ is the photon flux at the same wavelength. The subscripts i and t refer to, respectively, the flux incident on the material volume and the transmitted flux:

$$A(\lambda) = \log_{10}\left(\frac{\Phi_i(\lambda)}{\Phi_t(\lambda)}\right) = -\log_{10}(T(\lambda)).$$

Measurements may be taken from a rectangular cuvette volume with path length, l, of 10 mm. From this measurement, the molar absorptivity $\epsilon(\lambda)$ of the photoinitiator can be extracted, according to the equation below, where [PI] is the molar concentration of the photoinitiator in solution:

$$A(\lambda)=\epsilon(\lambda)*[PI]*l.$$

The intensity $I(z, \lambda)$ of light inside the photosensitive material may be modeled as decaying exponentially with propagation distance z, in accordance with the Beer-Lambert Law. Where the incident surface intensity is $I_0(\lambda)$, and adopting a change of base of logarithm, intensity can be expressed as:

$$I(z,\lambda)=I_0(\lambda)e^{-2.3\epsilon(\lambda)[PI]z}=I_0(\lambda)e^{-z/D_p}.$$

Here, $D_p=1/\alpha$ is the penetration depth. By illuminating off the absorption peaks, [PI] can be high enough to provide enough photoinitiator to complete curing even while offering the low required absorption. The emission spectrum of the 405 nm source may lie even further from the CQ absorption peak than the 455 nm source, which further benefits the process. From the spectrophotometer measurements, the penetration depth of the 3:1 BPAGDA/PEGDA mixture may be $D_p=2.2$ cm at the peak illumination wavelength of 455 nm, while that of the GelMA mixture may be $D_p=0.4$ cm at the peak illumination wavelength of 520 nm. These penetration depths may be on the same order as the container radii used, which makes the materials well suited to rapid printing while delivering the required 3D printing capability.

In embodiments for forming an opaque component, the resin composition may comprises a dye, such as crystal violet. Crystal violet has very low absorptivity at the photocuring wavelength used, 405 nm, allowing the printing illumination to penetrate, but absorbs strongly through much of the visible spectrum, giving the printed component a deep blue/violet color. For example, a dye concentration of 0.003% w/v may be used.

CAL Methods

As noted above, the present technology provides CAL methods using the photocurable resins of the present technology. In general, such methods comprise imaging a volume of photcurable resin of the present technology to cure selected portions of the volume of photocurable resin, and leave other portions uncured, to form a desired 3D part. Imaging may be performed using various devices and methods, including devices and methods among known in the art. For example, in some embodiments imaging of a resin is performed at a temperature of from 10° C. to 80° C. in a controlled atmosphere (e.g., inert gas, such as nitrogen, and controlled humidity). In some embodiments, the imaging is performed at ambient condition temperature. A video camera may be used to observe the formation of the part during the imaging process.

For example, in one aspect, such methods for forming (printing) a three dimensional (3D) object comprise providing a volume of photocurable resin of the present technology contained within an optically transparent resin container, and simultaneously directing optical projections from an optical subsystem at a plurality of angles θ through the volume of photocurable resin. The optical projections may further be directed about a z axis extending through the volume of photocurable resin. Each of the optical projections may be provided with a calculated three-dimensional intensity distribution acting over a fixed temporal exposure period. Over a fixed time period, during which projections from one or multiple angles are provided, the net exposure dose is sufficient to cure selected portions of the volume of photocurable resin, and leave other portions uncured, to form a desired 3D part.

In another embodiment, methods comprise providing a volume of photocurable resin contained within an optically transparent resin container. A z axis extends through the volume of photocurable resin and an r axis extends normal to the z axis. The optically transparent resin container may be rotated about the z axis while directing optical projections in an x' direction from a stationary optical subsystem at the resin container, in sequential fashion, along different angles θ relative to the z axis. A two dimensional (2D) projection function of the optical projection may be controlled at each angle θ. This projection function may deliver a controlled 3D exposure dose. Over a fixed temporal exposure period, which includes projections from multiple angles θ, a summed net 3D exposure dose may be generated in the resin volume. The summed 3D exposure dose may be sufficient to cause photocuring in desired regions and not in undesired regions.

In another aspect methods comprise providing a volume of photocurable resin contained within an optically transparent resin container, a z axis extending through the volume of photocurable resin and an x' axis extending normal to the z axis. The method may further comprise using an optical subsystem to generate an optical two dimensional (2D) projection function which generates a 3D intensity map. The method may further comprise causing at least one of the 2D projection or the resin container to rotate relative to the other to receive the optical 2D projection around a complete circumference of the volume of photocurable resin while maintaining the optical 2D projection directed through the volume of photocurable resin. A two dimensional (2D) projection function of the 2D projection may be controlled at each angle θ to deliver a controlled 3D exposure dose over a fixed temporal exposure period, and where a plurality of 2D projections is generated from a plurality of angles θ. The plurality of 2D projections may be summed to produce a 3D exposure dose in the resin volume which is sufficient to cause photocuring in desired regions, while being insufficient to cause photocuring in undesired regions.

To understand the relationship between the target 3D part geometry, and the computed projections, consider FIG. 1A, as well as the coordinate system designations in FIGS. 1B-1D. For the following discussion, it is convenient to adopt a global Cartesian coordinate system (x,y,z) to refer to the 3D build volume and a rotated Cartesian coordinate system (x',y',z') whose orientation depends on the angle θ of the projection being considered. In these coordinate systems, z is the axis for azimuthal arraying of exposures at angles θ around volume 10. For each angle θ, a projection is computed. At a particular angle θ, a projection can be defined as a two-dimensional function Pθ(y',z) which fully determines a three-dimensional intensity map 18(x,y,z) generated in the target volume (note that Pθ depends on the angle θ but will be referred to as a two-dimensional function as it has two spatial dimensions). In the simplest case the projection can be thought of as a two dimensional image in the (y',z) domain which propagates through the resin volume in the x' direction. In this idealized case, the 3D intensity profile generated by the projection looks like the (y',z) domain image extruded through the target volume in the x' direction. This approximation holds well physically if the illuminating projections are collimated. In medical imaging applications, this is analogous to parallel beam tomography. For the present disclosure, this is a sufficiently good approximation whenever the optical configuration has a long depth of focus (particularly relevant for the small diffraction angles available with current SLM technology). In the general case, an optical propagation and attenuation model describes the 3D intensity map generated from a 2D projection function at a particular angle. In this description and in FIG. 1A the idealized case is described for simplicity in describing the method.

The objective of the tomographic image computation is to design a set P(y',z,θ) of 2D projection images from a range of angles θ such that the 3D intensity map generated from the superposition of the 3D light fields generated from each projection closely or exactly approximates a target 3D intensity map. From a known target 3D intensity map we now consider design of the projections. To further simplify the explanation, we reduce the problem of generating a set of 2D projections for a 3D intensity map to that of generating a set of 1D projections P(y',θ) for a 2D intensity map I(x,y). Again, in this case, 1D refers to the one spatial dimension y'. In the physical (x,y,z) resin volume system, we can think of the 2D intensity map as a horizontal constant z slice of the true 3D intensity map. Ultimately, the 2D projection Pθ(y',z) at a given angle θ can then be generated by stacking of the each of the computed 1D projections at each z-plane for that particular angle.

Among the many ways to accomplish CT image reconstruction, two major approaches that lend themselves readily to dose-optimization for fabrication are filtered back-projection (FBP) and iterative optimization-based algorithms. Here we first consider the FBP approach and its limitations, and describe how it may be used to provide useful starting parameters for an optimization algorithm.

The FBP approach for reconstructing a 2D optical density distribution within an (x,y) plane for a given value of z starts with computing a mathematical 1D projection at each of M angular samples (θ=θ1, θ2, ... θM). These projections taken together comprise the Radon transform of the 2D image. From the projection slice theorem, as discussed in R. Bracewell, "Strip Integration in Radio Astronomy," Aust. J. Phys., Vol. 9, No. 2, p. 198, 1956 and R. N. Bracewell, "Numerical Transforms," Science, Vol. 248, No. 4956, pp. 697-704, May 1990, which are both hereby incorporated by reference into the present disclosure, it is known that the Fourier transform of each 1D projection at a particular angle θ is exactly equal to a 1D sample of the Fourier transform of the original 2D density distribution. This 1D sample lies along a line through the origin in the Fourier domain and is sloped at an angle θ. This is depicted in FIG. 1A. Sufficiently dense sampling in the Fourier domain is required for an accurate CT image reconstruction. To appropriately choose the number of samples M in the Fourier domain, one possible conservative heuristic is to ensure that the maximum distance between slices is no greater than the separation of N sample points in the radial direction. This leads to $\pi N/2$ angular samples within 180 degrees of angular range.

The lithographic fabrication of each 2D z plane can follow an algorithmic time reversal of the CT imaging process. The target 2D Intensity map for the slice $I_z(x,y)$ is transformed into the Fourier domain, then sampled along each of the M azimuthal angles, generating M 1D intensity distributions, or projections $P\theta(y')$, one for each angle $\theta1$, $\theta2$, ... $\theta M$. Each of these distributions is used to expose the target plane with its respective pattern from its specific angle, which corresponds to building up the sample in the Fourier domain from slices through the origin. FBP for CT reconstruction relies on high-pass spatial filtering before back-projection in order to deemphasize the low frequency oversampling inherent to the central slicing approach. An equivalent way to describe this would be as a radially increasing ramp filter. This filter typically leads to negative excursions in the back-projected images that are unphysical for lithography. Some heuristic approaches to eliminate negative values, producing images suitable for lithography, include imposed positivity constraints or offsetting the calculated image. The results of such heuristics impose trade-offs between the contrast and resolution of calculated dose distributions; however, they can be used as initial dose estimates for a constrained optimization procedure.

Briefly, an optimization procedure takes as its starting point a forward process model that relates resin monomer crosslinking to the received light energy dose. Various 2D versions of such models, such as discussed at D. Dendukuri, P. Panda, R. Haghgooie, J. M. Kim, T. A. Hatton, and P. S. Doyle, "Modeling of Oxygen-Inhibited Free Radical Photopolymerization in a PDMS Microfluidic Device," Macromolecules, Vol. 41, No. 22, pp. 8547-8556, November 2008, the teachings of which are hereby incorporated by reference herein, are available, with limited progress toward 3D analogs. Comparing the modeled degree of cure (induced by the summed dose distribution from all angles), to the desired part geometry, an error function is generated, which is reverse-transformed and used to modify the initial dose estimate. This cycle is iterated for a number of cycles sufficient to meet a particular error criterion, such as edge sharpness, contrast, or total error over the build volume. The optimization procedure provides a means for process non-linearities such as intensity absorption to be accurately modeled and accounted for in the image generation. This is a significant benefit in terms of feature quality. The extension from 2D planes into 3D is straightforward, with the 1D intensity patterns from each z plane assembled into a 2D y'-z image for projection at every angle $\theta$ corresponding to the particular x' propagation direction. Effectively, this is a physical projection of the computed Radon transforms for all z planes at each angle $\theta$ to reconstruct the desired 3D dose volume.

Figure 2:
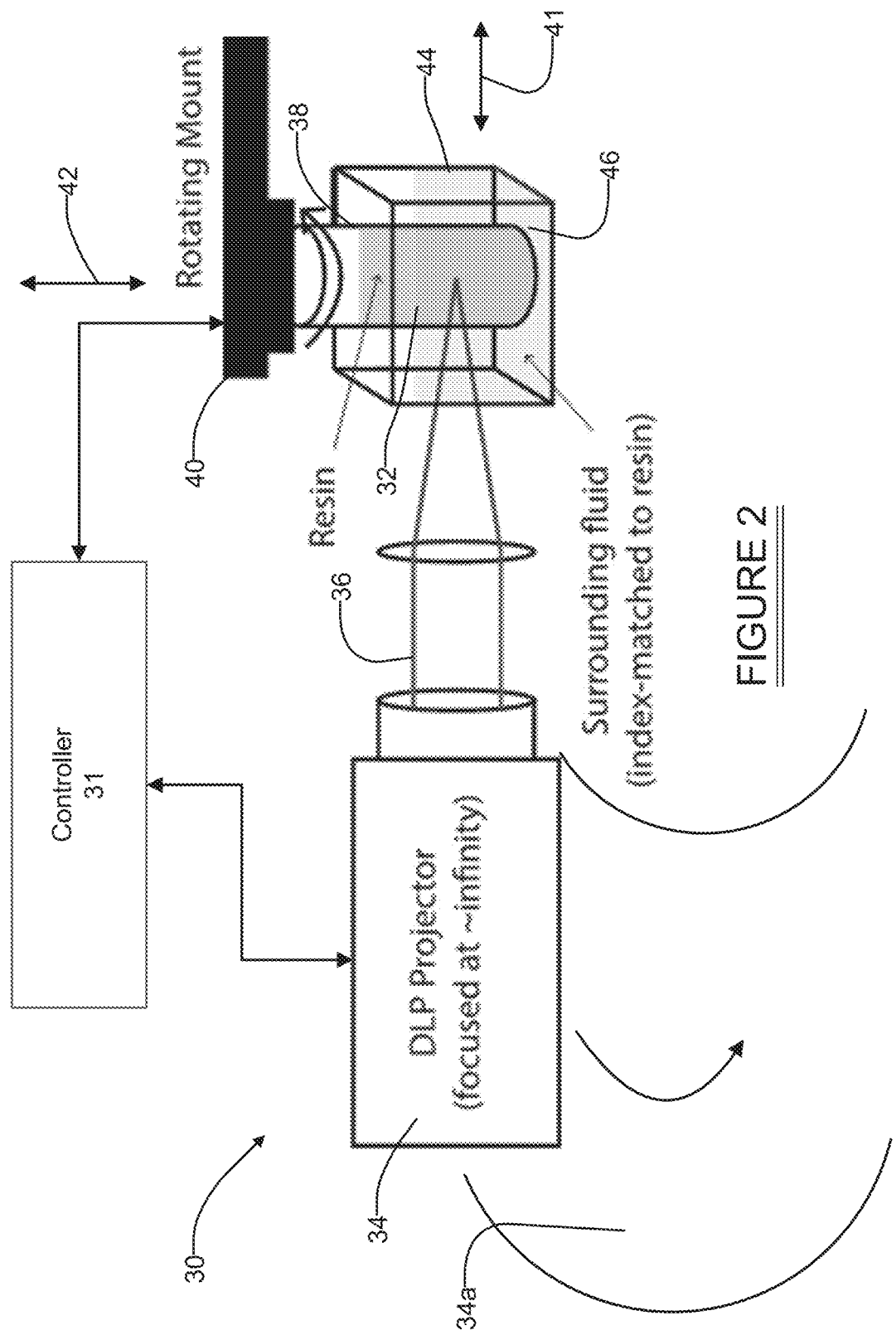
FIG. 2 shows a high level diagram of another embodiment of the present disclosure in which the target resin volume container is rotated by a rotating mount or stage, while an optical projection generating component provides a single projection at a fixed time. This projection creates a 3D intensity field in the volume. As the resin volume rotates with time and the angle θ is changed, the projections are updated.

Referring to FIG. 2, an exemplary system 30 is shown which generates a 3D exposure dose distribution over a fixed time interval by physical rotation of a target volume of resin 32 about a z axis 42, synchronized via a controller 31 with temporal manipulation of a single 2D optical projection from a digital light processing (DLP) projector or other image generation optical system 34. In the implementation as described previously herein, the image generation optical system 34 produces a collimated optical image or projection 36 from a single direction along an axis x' 41 that impinges on the target volume of resin 32. It will be appreciated that the images could also have some divergence (i.e., not collimated) and the algorithm to design them could be updated accordingly.

The relative angle $\theta$ between the incident light of the projection 36 and the target volume of resin 32 is changed in time as different (y',z) plane images are sequentially projected. Following the coordinate system convention described earlier and depicted in FIGS. 1B, 1C, and 1D, the (x,y,z) system rotates about the z axis as the target volume of resin 32 rotates and the (x',y',z) system remains fixed in space. Thus, as the target volume of resin 32 rotates, the angle $\theta$ between the x-axis and x'-axis changes. In one example, a resin containment vessel 38 that holds the target volume of resin 32 is mounted on a rotating mount or stage 40. The rotating stage rotates about z axis 42 and operation of the DLP projector 34 is synchronized with rotation of the mount 40 by the controller 31. The containment vessel 38 may be submerged within a second containment vessel 44 which contains a fluid 46 with the same (or similar) refractive index as the resin 32. This provides a flat interface where the refractive index changes and mitigates lensing effects which would arise at a curved interface of mismatched refractive index. Note that in the description of the above system, the coordinate notation is such that the x'-axis is stationary while the (x,y,z) coordinate system rotates with the resin containment vessel 38.

Another embodiment of the system 30 shown in FIG. 2 may involve the use of a plurality of DLP projectors 34 (i.e., a plurality of optical subsystems) positioned to face each of the four vertical sides of the second containment vessel 44, to generate the plurality of optical 2D projections. Still another embodiment may involve a modification to the system 30 shown in FIG. 2 in which the containment vessel 38 and the second containment vessel 44 are both held stationary, while the DLP projector 34 (i.e., the optical subsystem) is rotated on a doughnut shaped support 34a around the full circumference of the containment vessel 38 to produce the plurality of optical 2D projections.

CAL methods among those useful herein include the processes described in PCT Application PCT/US2018/024475, filed Mar. 27, 2018, and in Kelly et al., Science 363, 1075-1079 (2019), both of which are incorporated by reference herein.

Non-Limiting List of Embodiments

The present technology provides various embodiments including the embodiments listed below.

Embodiment A1

A method of forming a three dimensional (3D) object, comprising:
   simultaneously directing optical projections of light from optical subsystems at a plurality of angles $\theta$ through a volume of photocurable composition contained within an optically transparent resin container, the optical projections further being directed about a z axis extending through the volume of photocurable composition; and
   providing each of the optical projections with a calculated three-dimensional intensity distribution acting over a fixed temporal exposure period, which is sufficient to cure selected portions of the volume of photocurable composition, and leave other portions unmodified, to form the 3D object;

wherein the photocurable composition comprises a monomer, a photoinitiator, and a curing inhibitor, and exhibits transparency to the light and a non-linear response to the light.

Embodiment A2

The method of Embodiment A1, wherein the curing inhibitor is selected from the group consisting of oxygen; (2,2,6,6-Tetramethyl-1-piperidinyloxy); phenothiazine; 4-methoxyphenol; N-Nitroso-N-phenylhydroxylamine aluminum salt; tetraethylthiuram disulfide; nitroxide spin trap agents such as Di-tert-butyl nitroxide, and 2,2,5-Trimethyl-4-phenyl-3-azahexane-3-nitroxide; and combinations thereof.

Embodiment A3

The method of Embodiment A2, wherein the curing inhibitor comprises oxygen and the monomer is an acrylate.

Embodiment A4

The method of Embodiment A3, wherein the composition is made by a process comprising warming the volume of the monomer and photoinitiator, such as in a water bath at 60° C. for 5 to 20 seconds, to reduce the viscosity of the resin; and exposing the volume of the monomer and photoinitiator to oxygen, such as by transferring the resin to a vessel wherein the resin has a large surface area exposed to ambient air.

Embodiment A5

The method of any of Embodiments A1-A4, wherein the photocurable composition further has a viscosity which inhibits diffusive transport.

Embodiment A6

The method of Embodiment A5, wherein the photocurable composition has a viscosity of at least 1000 cP.

Embodiment A7

The method of one of Embodiments A1-A6, wherein the change in refractive index of the photocurable composition upon curing is not greater than 0.01.

Embodiment A8

The method of any one of Embodiments A1-A7, wherein the photocurable composition is a liquid at the conditions of the directing of the optical projections.

Embodiment A9

The method according to any one of Embodiments A1-A7, wherein the photocurable composition is a solid or semi-sold at the conditions of the directing of the optical projections.

Embodiment A10

The method according to Embodiment A9, wherein the photocurable composition is a gel, such as comprising gelatin methacrylate (GelMA) hydrogel.

Embodiment B1

A photocurable resin for use in a volumetric additive manufacturing process wherein curing of the resin in a volume of the resin is initiated upon projection of illumination energy into the volume to form images of cured material, the resin comprising:
a photocurable resin prepolymer; and
a photoinitiator;
wherein the resin has one or more of the following characteristics: (a) non-linearity of curing response to the illumination energy; (b) transparency to the illumination energy; (c) viscosity suitable to control diffusive transport and settling of cured material in the volume; and (d) a refractive index suitable to minimize distortions of the images as they are projected into the volume of the resin.

Embodiment B2

The photocurable resin of Embodiment B1, wherein the photocurable resin prepolymer comprises acrylate, methacrylate, olefin, epoxide, or silane monomers, or mixtures thereof.

Embodiment B3

The photocurable resin of Embodiment B2, wherein the resin prepolymer comprises bisphenol A glycerolate (1 glycerol/phenol) diacrylate (BPAGDA) and poly(ethylene glycol) diacrylate (PEGDA).

Embodiment B4

The photocurable resin of Embodiment B2, wherein the resin prepolymer comprises gelatin methacrylate Embodiment B5

The photocurable resin of Embodiment B2, wherein the resin prepolymer comprises tris[2-(3-mercaptopropionyloxy)ethyl] isocyanurate, and 1,3,5-triallyl-1,3,5-triazine-2,4,6(1H,3H,5H)-trione.

Embodiment B6

The photocurable resin of Embodiment B5, wherein the resin prepolmer further comprises triethylene glycol diallyl ether.

Embodiment B7

The photocurable resin of Embodiment Embodiment B2, wherein the photoinitiator is a Norrish Type I or Type II photoinitiatior, such as a photoinitiator selected from the group consisting of: camphorquinone; ethyl 4-dimethylaminobenzoate (EDAB); phenylbis(2,4,6-trimethylbenzoyl) phosphine oxide; bis(η5-2,4-cylcopentadien-1-yl)-bis(2,6-difluoro-3-(1H-pyrrol-1-yl)-phenyl) titanium; 2-Methyl-4'-(methylthio)-2-morpholinopropiophenone; tris(2,2-bipyridyl)dichlororuthenium(II) hexahydrate; sodium persulfate; and mixtures thereof.

Embodiment B8

The photocurable resin of any one of Embodiments B1-B7, wherein the resin has the non-linear curing response to the illumination energy, preferably wherein the illumination energy is light having a wavelength of from 350 to 800 nm.

Embodiment B9

The photocurable resin of one of Embodiments B1-B8, further comprising a curing inhibitor.

Embodiment B10

The photocurable resin of Embodiment B9, wherein the curing inhibitor is selected from the group consisting of oxygen; (2,2,6,6-Tetramethyl-1-piperidinyloxy); phenothiazine; 4-methoxyphenol; N-Nitroso-N-phenylhydroxylamine aluminum salt; tetraethylthiuram disulfide; nitroxide spin trap agents such as Di-tert-butyl nitroxide, and 2,2,5-Trimethyl-4-phenyl-3-azahexane-3-nitroxide; and combinations thereof.

Embodiment B11

The photocurable resin of Embodiment B10, wherein the resin prepolymer comprises an acrylate; and the curing inhibitor comprises oxygen.

Embodiment B12

The photocurable resin of any one of Embodiments B1-B11, wherein the photocurable resin has a viscosity of at least 1000 cP.

Embodiment B13

A method of forming a three-dimensional object comprising: exposing a region of a volume of photocurable resin according to any one of Embodiments B1-B12 to light operable to initiate curing of the photocurable resin.

Embodiment B14

A method of Embodiment B13, wherein the light has a wavelength of from 350 to 800 nm.

Embodiment B15

The method of any one of Embodiments B1-B14, wherein the photocurable composition is a liquid at the conditions of the projection of the illumination energy into the volume.

Embodiment B16

The method according to any one of Embodiments B1-B14, wherein the photocurable composition is a solid or semi-sold at the conditions of the projection of the illumination energy into the volume.

Embodiment C1

A photocurable resin for use in a volumetric additive manufacturing process comprising:
a photocurable resin prepolymer;
a photoinitiator; and
a curing inhibitor.

Embodiment C2

The photocurable resin of Embodiment C1, wherein the photocurable resin prepolymer comprises acrylate, methacrylate, olefin, epoxide, or silane monomers, or mixtures thereof.

Embodiment C3

The photocurable resin of Embodiment C2, wherein the resin prepolymer comprises bisphenol A glycerolate (1 glycerol/phenol) diacrylate (BPAGDA) and poly(ethylene glycol) diacrylate (PEGDA).

Embodiment C4

The photocurable resin of Embodiment C2, wherein the resin prepolymer comprises gelatin methacrylate Embodiment C5

The photocurable resin of Embodiment C2, wherein the resin prepolymer comprises tris[2-(3-mercaptopropionyloxy)ethyl] isocyanurate, and 1,3,5-triallyl-1,3,5-triazine-2,4,6(1H,3H,5H)-trione.

Embodiment C6

The photocurable resin of Embodiment C5, wherein the resin prepolmer further comprises triethylene glycol diallyl ether.

Embodiment C7

The photocurable resin of Embodiment C1 or Embodiment C2, wherein the photoinitiator is a Norrish Type I or Type II photoinitiatior, such as a photoinitiator selected from the group consisting of: camphorquinone; ethyl 4-dimethylaminobenzoate (EDAB); phenylbis(2,4,6-trimethylbenzoyl)phosphine oxide; bis(η5-2,4-cylcopentadien-1-yl)-bis(2,6-difluoro-3-(1H-pyrrol-1-yl)-phenyl) titanium; 2-Methyl-4'-(methylthio)-2-morpholinopropiophenone; tris(2,2-bipyridyl)dichlororuthenium(II) hexahydrate; sodium persulfate; and mixtures thereof.

Embodiment C8

The photocurable resin of any one of Embodiments C1-C7, wherein the resin exhibits a non-linear curing response to illumination energy used in the volumetric additive manufacturing process, preferably light having a wavelength of from 350 to 800 nm.

Embodiment C9

The photocurable resin of one of Embodiments C1-C8, wherein the curing inhibitor is selected from the group consisting of oxygen; (2,2,6,6-Tetramethyl-1-piperidinyloxy); phenothiazine; 4-methoxyphenol; N-Nitroso-N-phenylhydroxylamine aluminum salt; tetraethylthiuram disulfide; nitroxide spin trap agents such as Di-tert-butyl nitroxide, and 2,2,5-Trimethyl-4-phenyl-3-azahexane-3-nitroxide; and combinations thereof.

Embodiment C10

The photocurable resin of Embodiment C9, wherein the resin prepolymer comprises an acrylate; and the curing inhibitor comprises oxygen.

Embodiment C13

A method of forming a three-dimensional object comprising: exposing a region of a volume of photocurable resin according to any one of Embodiments C1-12 to light operable to initiate curing of the photocurable resin.

Embodiment C14

A method of Embodiment C13, wherein the light has a wavelength of from 350 to 800 nm.

Embodiment C15

A method of Embodiment C13 or Embodiment C14, wherein the photocurable resin has a non-linear curing response to the light.

Embodiment C16

The method of any one of Embodiments C1-C15, wherein the photocurable composition is a liquid at the conditions of the volumetric additive manufacturing process.

Embodiment C17

The method according to any one of Embodiments C1-C15, wherein the photocurable composition is a solid or semi-sold at the conditions of the volumetric additive manufacturing process.

Non-limiting Discussion of Terminology

The foregoing description is merely illustrative in nature and is in no way intended to limit the technology, its application, or uses. The broad teachings of the technology can be implemented in a variety of forms. Therefore, while this technology includes particular examples, the true scope of the technology should not be so limited since other modifications will become apparent upon a study of the drawings, the specification, and the following claims.

The headings (such as "Background" and "Summary") and sub-headings used herein are intended only for general organization of topics within the present technology, and are not intended to limit the technology of the technology or any aspect thereof. In particular, subject matter disclosed in the "Background" may include novel technology and may not constitute a recitation of prior art. Subject matter disclosed in the "Summary" is not an exhaustive or complete technology of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It should be understood that one or more steps within a method may be executed in different order (or concurrently) without altering the principles of the present technology. Further, although each of the embodiments is described above as having certain features, any one or more of those features described with respect to any embodiment of the technology can be implemented in and/or combined with features of any of the other embodiments, even if that combination is not explicitly described. In other words, the described embodiments are not mutually exclusive, and permutations of one or more embodiments with one another remain within the scope of this technology. For example, a component which may be A, B, C, D or E, or combinations thereof, may also be defined, in some embodiments, to be A, B, C, or combinations thereof.

As used herein, the phrase at least one of A, B, and C should be construed to mean a logical (A OR B OR C), using a non-exclusive logical OR, and should not be construed to mean "at least one of A, at least one of B, and at least one of C."

As used herein, the words "prefer" or "preferable" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein. Further, as used herein the term "consisting essentially of" recited materials or components envisions embodiments "consisting of" the recited materials or components.

"A" and "an" as used herein indicate "at least one" of the item is present; a plurality of such items may be present, when possible.

Numeric values stated herein should be understood to be approximate, and interpreted to be about the stated value, whether or not the value is modified using the word "about." Thus, for example, a statement that a parameter may have value "of X" should be interpreted to mean that the parameter may have a value of "about X." "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates variations that may arise from ordinary methods of manufacturing, measuring or using the material, device or other object to which the calculation or measurement applies.

As referred to herein, ranges are, unless specified otherwise, inclusive of endpoints and include technology of all distinct values and further divided ranges within the entire range. Thus, for example, a range of "from A to B" or "from about A to about B" is inclusive of A and of B. Further, the phrase "from about A to about B" includes variations in the values of A and B, which may be slightly less than A and slightly greater than B; the phrase may be read be "about A, from A to B, and about B." Technology of values and ranges of values for specific parameters (such as temperatures, molecular weights, weight percentages, etc.) are not exclusive of other values and ranges of values useful herein.

It is also envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that technology of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of forming a three dimensional (3D) object, comprising:
    simultaneously directing optical projections of light from optical subsystems at a plurality of angles θ through a volume of photocurable composition contained within an optically transparent resin container, the optical projections further being directed about a z axis extending through the volume of photocurable composition; and
    providing each of the optical projections with a calculated three-dimensional intensity distribution acting over a fixed temporal exposure period, which is sufficient to cure selected portions of the volume of photocurable composition, and leave other portions unmodified, to form the 3D object;
    wherein the photocurable composition comprises a monomer, a photoinitiator, and a curing inhibitor, and exhibits transparency to the light and a non-linear response to the light.

2. The method of claim 1, wherein the curing inhibitor is selected from the group consisting of oxygen; (2,2,6,6-Tetramethyl-1-piperidinyloxy); phenothiazine; 4-methoxyphenol; N-Nitroso-N-phenylhydroxylamine aluminum salt; tetraethylthiuram disulfide; Di-tert-butyl nitroxide; 2,2,5-Trimethyl-4-phenyl-3-azahexane-3-nitroxide; and combinations thereof.

3. The method of claim 2, wherein the curing inhibitor comprises oxygen and the monomer is an acrylate.

4. The method of claim 1, wherein the photocurable composition further has a viscosity of at least 1000 cP.

5. The method of claim 1, wherein a change in refractive index of the photocurable composition upon curing is not greater than 0.01.

6. A method of forming a three dimensional (3D) object, comprising:
    simultaneously directing optical projections of light from optical subsystems at a plurality of angles θ through a volume of photocurable composition contained within an optically transparent resin container, the optical projections further being directed about a z axis extending through the volume of photocurable composition; and
    providing each of the optical projections with a calculated three-dimensional intensity distribution acting over a fixed temporal exposure period, which is sufficient to cure selected portions of the volume of photocurable composition, and leave other portions unmodified, to form the 3D object;
    wherein the photocurable composition comprises a monomer, a photoinitiator, and a curing inhibitor, and exhibits transparency to the light and a non-linear response to the light; and
    wherein a change in refractive index of the photocurable composition upon curing is not greater than 0.03.

7. The method of claim 6, wherein the change in refractive index of the photocurable composition upon curing is not greater than 0.01.

8. The method of claim 6, wherein the curing inhibitor is selected from the group consisting of oxygen; (2,2,6,6-Tetramethyl-1-piperidinyloxy); phenothiazine; 4-methoxyphenol; N-Nitroso-N-phenylhydroxylamine aluminum salt; tetraethylthiuram disulfide; Di-tert-butyl nitroxide; 2,2,5-Trimethyl-4-phenyl-3-azahexane-3-nitroxide; and combinations thereof.

9. The method of claim 7, wherein the curing inhibitor comprises oxygen and the monomer is an acrylate.

10. The method of claim 6, wherein the photocurable composition further has a viscosity of at least 1000 cP.

11. The method of claim 6, wherein the photoinitiator is a Norrish Type I or Type II photoinitiator.

* * * * *